Figures 1A, 1B, 1C:
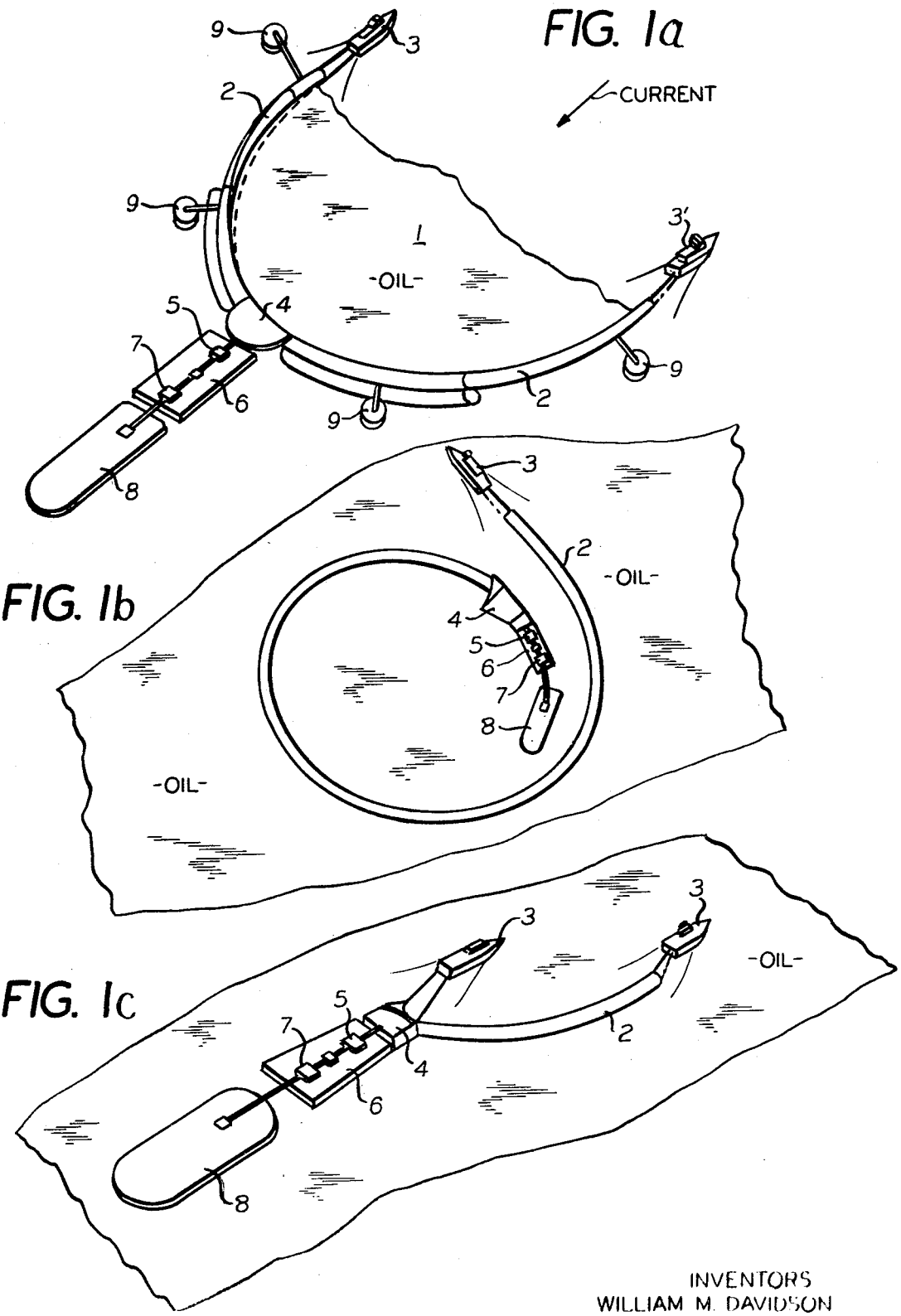

United States Patent [19]
Davidson et al.

[11] 3,710,943
[45] Jan. 16, 1973

[54] VARIABLE DISPLACEMENT FENCE FOR OIL SPILL CONTAINMENT AND RECOVERY

[76] Inventors: William M. Davidson, 57 Briarcliff Road; Howard W. Cole, Jr., 12 Vale Drive, both of Mountain Lakes, N.J. 07046

[22] Filed: March 5, 1970

[21] Appl. No.: 16,692

[52] U.S. Cl.............................210/242, 210/DIG. 21
[51] Int. Cl. ................................................C02b 9/02
[58] Field of Search....210/242, 83, 76, 523, DIG. 21

[56] References Cited

UNITED STATES PATENTS

| | | | |
|---|---|---|---|
| 3,476,246 | 1/1969 | Dahan | 210/83 |
| 3,245,539 | 4/1966 | Earle | 210/242 |
| 3,503,512 | 3/1970 | Desty et al. | 210/242 |
| 3,508,652 | 4/1970 | Woolley | 210/76 |
| 3,532,219 | 10/1970 | Valdespino | 210/242 |

*Primary Examiner*—Reuben Friedman
*Assistant Examiner*—T. A. Granger

[57] ABSTRACT

A flexible, inflatable, elongated barrier useful for the containment, separation and recovery of oil spilt on water is constructed in the form of a tunnel inside of which there is a continuous passage for oil that enters the barrier beneath the waters surface on the upstream side and leaves the barrier on either end of the tunnel. The barrier is weighted at the bottom by suitable ballast means and buoyed at the top by long, continuous air chambers. Lengthwise cables are attached along the top and bottom of the barrier for towing and control purposes. The barrier can be submerged during emergency conditions and is constructed for roll-up on a reel either as a continuous single element of multiplicity of sections.

4 Claims, 8 Drawing Figures

PATENTED JAN 16 1973

3,710,943

SHEET 1 OF 2

INVENTORS
WILLIAM M. DAVIDSON
HOWARD W. COLE, JR.

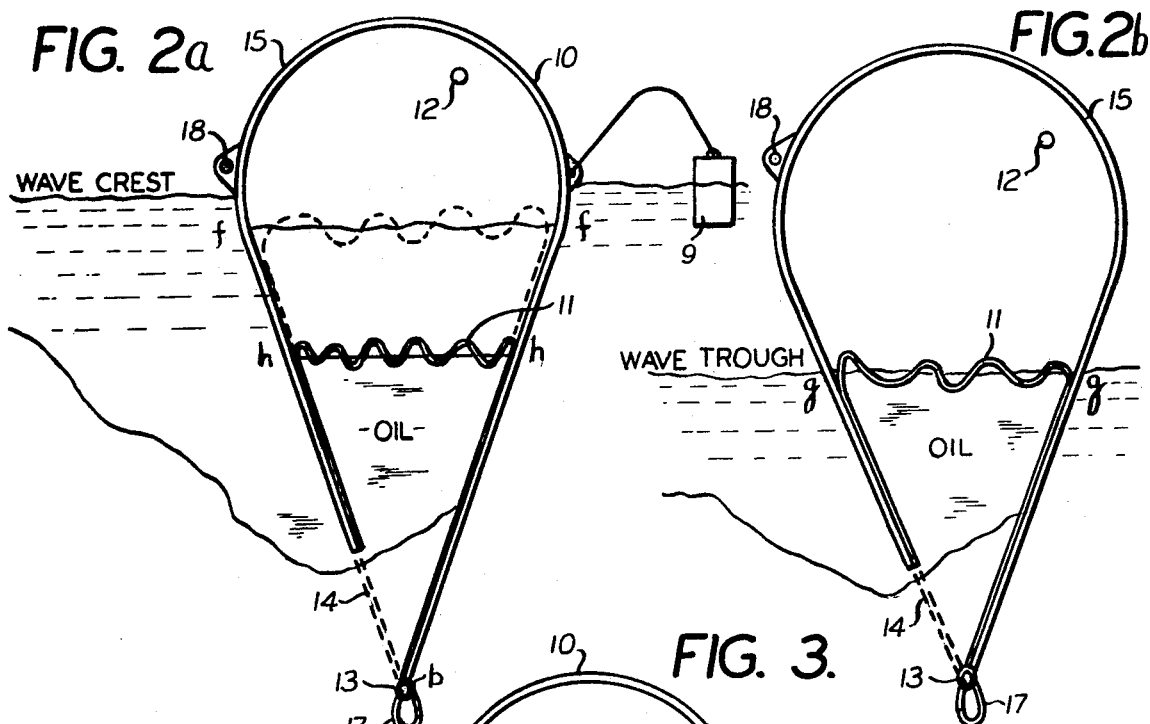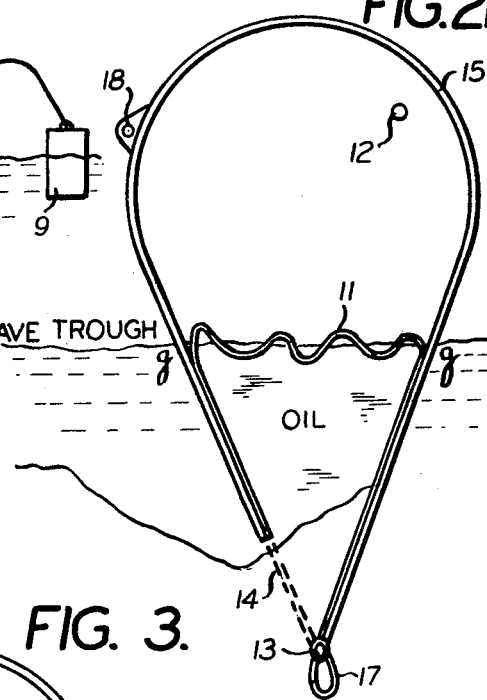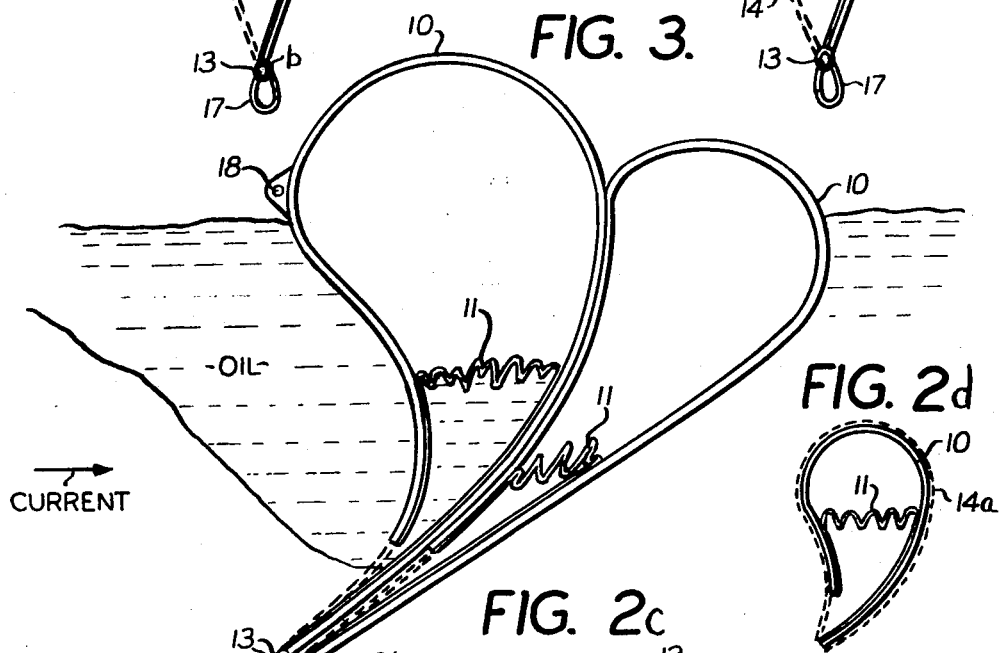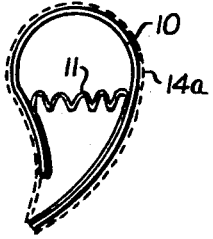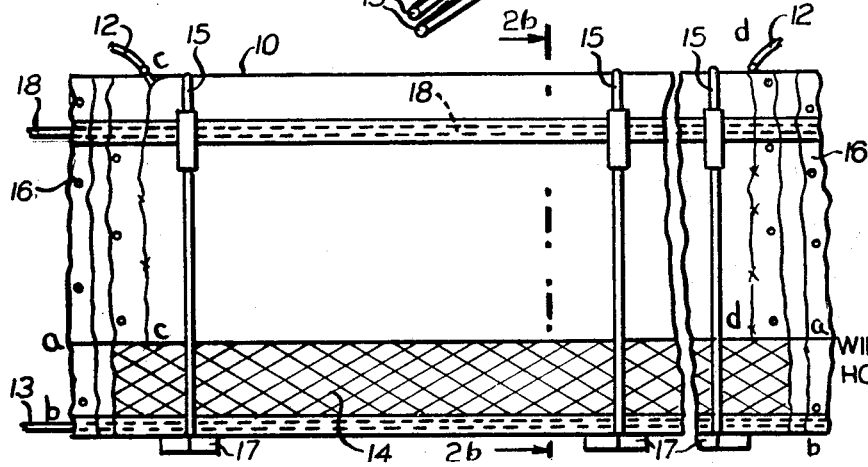

VARIABLE DISPLACEMENT FENCE FOR OIL SPILL CONTAINMENT AND RECOVERY

For the control of oil spills in heavy seas, such as might occur with disabled tankers or oil escaping from offshore wells, there is a need for light, portable barriers or fences that can be rushed to the scene of the spill, preferably by air transport, and deployed rapidly. Oil spills disperse quickly on the water surface by force of wind and wave, unless properly contained. Once contained, the oil should be removed promptly, otherwise rapid degradation of the oil occurs by the loss of light oil fractions into the atmosphere and by reaction with the sun and the sea.

This invention relates to an air-inflatable barrier that satisfies this need and, further, serves the dual function of both containment and recovery. The concept described herein provides a barrier that is responsive to the mean wave height, rather than to each wave in a heavy sea.

Most of the containment systems suggested to-date employ the principle of a floating boom, or other fixed flotation elements, that support a fence or skirt, with the intent of maintaining the boom on top of the water and the bottom of the skirt a fixed distance below the surface in order to provide a barrier for the spilled oil. None of the available designs have made efficient use of the principles of buoyancy, as required for this application and, therefor, do not conform well to the surface in heavy seas. Efforts to modify such fences in order to prevent oil from escaping over the boom or under the skirt often take the form of additional height or depth of the fence which adds drag from wind or water currents and does not improve the performance of the fence.

It is possible to design a free body that will conform with the surface of the sea and maintain a relatively stable position with respect to the vertical movement of the water surface. However, when several sections are coupled together in order to form a long, continuous fence, the individual sections can no longer be regarded as free bodies. The large forces generated by wave action will cause the sections to interact and develop very substantial loads between sections of the fence. These loads added to the strains imposed by wind and water currents generally will lead to destruction of the fence and, prior to that time, will impair effective performance of the fence.

This invention departs from the thesis that requires an oil containment barrier to conform with every contour of the water surface in order to be effective. The new concept is based on the design of a barrier that will conform to the mean wave height. Such a barrier is designed to maintain essentially a fixed vertical position with respect to mean sea level, the height of the barrier being sufficient to contain the wave crests as well as the wave troughs. This is analogous to a swimming pool with stationary walls for retaining the water. The same principle is achieved in the design of an oil containment barrier that is supported by a bubble of air enclosed in an air chamber made with simply constructed and arranged elongate flexible plastic sheets, each of which is at least several wavelengths long. The amount of air used to inflate the air chamber can be adjusted to change the mean height of the fence, but the air is free to circulate from one end of the chamber to the other maintaining essentially mean total volume and pressure. At locations along the barrier the cross-sectional area will decrease near the wave crests and increase at the wave troughs.

In accordance with one embodiment, this invention relates to the use of inflatable buoyancy devices for each section of the barrier wherein the length of each section is at least twice the wavelength of the largest waves to be contained and wherein the construction of the gas-filled chamber provides for the equalization of gas pressure rapidly over the entire length of the section in response to wave action.

In accordance with another embodiment, this invention relates to the use of inflatable buoyancy devices for each section of the barrier wherein the mean height of each section and its elevation in the water can be adjusted individually by varying the amount of inflation, including the provision for submerging the entire barrier for its protection during severe storms.

In accordance with yet another embodiment, this invention relates to the use of inflatable buoyancy devices wherein the barrier is composed of sections that when connected provide a barrier having continuous, well-rounded contours projecting above the water surface, thereby minimizing wind resistance and air turbulence In accordance with yet another embodiment, this invention relates to the use of the variable displacement barrier as an integral part of the oil recovery system, as well as for the containment of oil spills, such as for funneling the oil to a common weir or skimmer.

In accordance with yet another embodiment, this invention relates to a means of controlling the position of such a fence and a means for towing it through the water by means of two cables, one cable being attached to the lower extremity of the fence that is submerged and the other cable being attached to the air chamber near the top of the fence.

In accordance with yet another embodiment, this invention relates to a barrier design, embodying the principles set forth herein, that can be fabricated entirely, except for cables and weights, from durable plastic, rubber or other flexible sheet materials in simple, flat-sandwich configuration that can be readily coiled on a reel for storage and transport.

In accordance with yet another embodiment, this invention relates to the use of two such barriers in parallel, the inner barrier being used to contain oil and withstand wind and water forces, while the outer barrier furnishes added buoyancy and support for the inner barrier as well as offering a backup for containment of oil spilled over or under the inner barrier.

Accordingly, it is an object of this invention to provide a simple, light-weight, adjustable, economical, readily transportable and easily deployed inflatable barrier for the containment and recovery of oil spills.

It is another object of this invention to provide an oil containment and recovery barrier that can be completely submerged in order to protect it from damage during sudden and severe storms, then subsequently re-inflated and recovered for further use.

How these and still further objects and advantages of this invention are achieved will become apparent from the following detailed specification, appended claims and attached drawings.

Referring to the drawings, which illustrate the invention, and in which like reference characters indicate like parts throughout the several views:

FIG. 1 in panoramic view illustrates typical uses of the invention for the containment and recovery of oil spills on water; Opp FIG. 2 is a vertical cross-section and side view of the variable displacement barrier illustrating the method of construction and technique for containment of an oil spill;

FIG. 3 is a vertical cross-section view of a dual barrier using two inflatable, variable displacement barriers in parallel.

Referring in greater detail to FIG. 1a, numeral 1 indicates in its entirety a complete system for oil containment and recovery. Barrier sections 2 are held in position to contain the oil slick against the wind and water currents by tugs 3. Barrier sections 2 are connected at the trailing end of the loop to a common weir or skimmer 4 where the oil is collected for removal from the water. Pump 5 is used to transfer oil from weir 4 to barge 6 which may contain equipment or other provisions for separation of oil from water. The oil is then transferred from barge 6 by means of pump 7 into storage pontoon 8. Buoys 9, attached to barrier sections 2 by cable and air hose, are used to inflate barrier sections 2 as well as to support them when deflated and submerged for protection during storms. In the event that system 1 is used in waters where the current is in excess of several knots, it is likely that the entire system would move with the current and, thereby, prevent the escape of oil under barrier sections 2. FIG. 1b illustrates an alternate use of barrier sections 2 in which oil is recovered by using tug 3 to tow barrier sections 2 in a spiral path around or through the oil slick so that oil collected inside of or against barrier sections 2 is conducted to weir 4 and thence transferred to barge 6 and pontoon 8 by pumps 5 and 7. FIG. 1c illustrates still another method of skimming by towing a shorter length of barrier sections 2 at a shallow angle through the water by proper positioning of tugs 3 to collect oil against barrier sections 2 and conduct it to weir 4 for recovery, separation and storage. Barrier sections 2 can be used for any of the above systems, either static or towed. In inland waterways, where there is more protection from wind and wave, the amount of draft can be reduced by increasing the amount of inflation of barrier sections 2.

FIG. 2 shows the method of construction and the principle of operation of barrier sections 2. As illustrated in FIGS. 2a and 2b, the inflatable chamber of the barrier may be simply constructed by bonding together two flexible sheets of plastic or rubber material, such as PVC, polypropylene, neoprene or other similar film material. Elongate, flexible sheets 10 and 11, of equal width and length and rectangular in shape, are placed flat against each other and then bonded together along four edges of the rectangle (seams $a-a$, $b-b$, $c-c$ and $d-d$ of FIG. 2c ) to form a long, inflatable chamber. Valve 12 is attached to this chamber to provide for inflation with gas, such as air. Elongate, perforate, flexible sheet 14 is bonded to sheets 10 and 11 along seams $a-a$ and $b-b$ connecting said spaced apart seams to form a collection chamber with open ends and with elongate inlet in communication with said chamber. An alternate method of construction is to extend perforate sheet 14 to continuously envelop the exterior of said barrier, both edges of perforate sheet 14 being joined along seam $b-b$; use of this construction avoids the need for cable attachments directly to said air chamber. Harness 15 can be added at regular intervals along the length of barrier sections 2 to support the loads from cable 18. Cable 13, retained along seam $b-b$, and cable 18, attached to harness 15, are used to interconnect barrier sections 2 and to control the position of said barrier in relation to drag forces applied against said barrier. The ends of barrier sections 2 are interconnected by means of flaps 16 which are flexibly extended beyond seams $c-c$ and $d-d$, thus providing a continuous passage or tunnel under the inflated chamber. Air pressure inside of said air chamber causes sheets 10 and 11 to separate and assume a loosely arranged and horizontally disposed configuration, generally as shown in FIG. 2a and 2b. Outer elongate sheet 10 conforms flexibly to internal air pressure and to local changes in external water pressure; its shape being alterable by adjustment of ballast 17 and cables 13 and 18. Elongate sheet 11 is forced against the surface of the water and oil inside of said collection chamber, as shown at $f-f$, $g-g$ and $h-h$ of FIG. 2a and 2b, its function being to complete the air chamber and thereby provide variable volume to said air chamber responsive to wave action. Each of the barrier sections 2 can be inflated separately and its pressure adjusted independently from other fence sections; alternatively, a common air supply can be connected to all barrier sections 2 simply by interconnecting the air supply lines attached to valves 12. The use of perforate sheet 14 permits water and oil to enter inside the collection chamber while excluding any heavy debris.

How barrier sections 2 operate and respond to the mean height of the waves can be seen by further reference to FIGS. 2a and 2b. For purposes of illustration, let it be assumed that the overall height of barrier sections 2 is 6 feet and that the section length is at least several wavelengths, say 100 feet long. To adjust the barrier for proper operation with a wave height condition of 4 feet, the air chamber is inflated through valve 12 until the top of barrier sections 2 remains about 1 foot above the crest of a 4-foot wave, as illustrated in FIG. 2(a). Under this condition, air entrapped inside the air chamber will displace water from inside of the collection chamber, the amount of displacement varying according to the local wave condition, including wave frequency. At a wave crest, displacement might be to a level such as shown at $f-f$, whereas, simultaneously, near a trough, the gas volume would expand because the water level inside and outside the collection chamber had dropped to a level such as $g-g$ (refer to FIGS. 2a and 2b). Air entrapped in the air chamber moves along the fence at a much faster rate than the water around the fence and, thus, air pressure within the air chamber is essentially equalized along the entire length of barrier sections 2. Displacement of water inside the barrier will vary with wave frequency; the shorter the wavelength, the less displacement because of the slow rate at which the water can be moved. In order to increase the amount of freeboard at the wave crests, ballast 17 can be added and the gas pressure inside the air chamber will be correspondingly increased; the barrier sections 2 will elongate vertically and the additional buoyancy required will be obtained by the displacement of water from inside the collection chamber to a level such as h—h of FIG. 2a. How barrier sections 2 are used to collect and remove oil is also illustrated by reference to FIG. 2a. The build-up of oil against the barrier, in the manner illustrated, is accompanied by an increase in the viscosity of the oil, according to tests on oil slicks. The flow of water under the barrier tends to carry oil with it, separation of oil and water occurring at a relative velocity of about 5 feet per second. In some instances it will be necessary to allow the barrier to drift with the current in order not to exceed this relative velocity. Under such conditions, the oil will descend as far as a—a in FIG. 2, then pass through perforate sheet 14 and float up inside of the collection chamber displacing water from that space. If barrier sections 2 were retained only by cable 13, drag forces would overcome the buoyancy forces and oil would spill over the top of the barrier. However, by applying a restraining force at the top of barrier sections 2, by means of cable 18, harnesses 15 and perforate sheet 14, barrier sections 2 become large sea anchors having a configuration more like that shown in FIG. 3. Thus, it can be seen that the escape of oil from barrier sections 2 can be prevented by manipulation of cables 13 and 18, by controlling the drift rate of the barrier in relation to the current velocity, and by the removal of oil as it accumulates against the barrier and inside of the collection chamber.

FIG. 2d illustrates an alternate method of construction of barrier sections 2 wherein perforate sheet 14 is extended and enlarged to completely surround and enclose the barrier. The enlarged perforate sheet 14a aids in distributing tensile loads and other forces applied to barrier sections 2 and, further, protects the air chamber from damage. Using this alternate construction, it is also unnecessary to use laminated or reinforced material for the air chamber itself, thereby enhancing the gas-tight integrity of this important element of barrier sections 2.

FIG. 3 illustrates another application of barrier sections 2 in which two barriers are used in parallel with each other to further insure against the escape of oil. Both barriers are of the same size and are constructed as illustrated in FIG. 2. A strong current flowing against the barrier from the oil slick side, such as would occur in the application shown in FIG. 1a in the area of weir 4, will force the inner barrier against the outer barrier. Should the outer barrier become fully immersed in the water, its full buoyancy will be utilized for supporting the inner barrier and thereby aid in maintaining adequate free-board on the inner barrier. It is further possible to use shorter lengths of barrier sections 2 for the outer barrier (e.g., 1 wavelength or less), such that the buoyancy provided by these shorter sections will increase more nearly in conformance with the wave crests; this alternate arrangement thereby provides a method of adjusting the amount and location of support for the inner barrier.

As will be seen by those skilled in the art in the light of the foregoing disclosure, many modifications, alterations and substitutions are possible in the practice of this invention without departing from the spirit or the scope thereof.

We claim:
1. An inflatable, flexible, elongated barrier for the collection and removal of floating liquids, such as oil, from the surface of a body of water comprising:
   a. a first elongate, flexible, sheet, said sheet being folded upon itself along its long axis whereby an elongate tunnel is formed by said folded sheet and the elongate edges of said folded sheet are spaced apart to define an elongate inlet in communication with said tunnel;
   b. a second elongate, flexible, sheet loosely arranged and horizontally disposed within said tunnel and constructed and arranged therein whereby a closed first air chamber is defined within said tunnel continuously along its elongate dimension and a second elongate collection chamber with open ends is defined between said elongate sheet and said spaced apart elongate edges, whereby said loosely arranged second elongate sheet provides variable volume to said first air chamber responsive to wave action on the surface of said body of water;
   c. a third elongate flexible perforate sheet connecting said spaced apart elongate edges whereby oil and water may enter said elongate collection chamber when said spaced apart elongate edges are arranged below the surface of said body of water;
   d. means for inflating said first closed air chamber;
   e. cable means attached to said first closed air chamber and to said elongate collection chamber;
   f. ballast means attached to at least one of said elongate edges of said tunnel whereby said elongate edges are maintained below the surface of said body of water.

2. The apparatus of claim 1 wherein said perforate sheet is arranged continuously enveloping the exterior of said barrier.

3. The apparatus of claim 1 wherein said first elongate flexible sheet comprises two or more flexible sheets bonded together to form one or more inflatable gas chambers between said sheets.

4. The apparatus of claim 2 comprising two barriers constructed and arranged whereby said elongate inlets are in parallel relationship below the surface of said body of water.

* * * * *